UNITED STATES PATENT OFFICE.

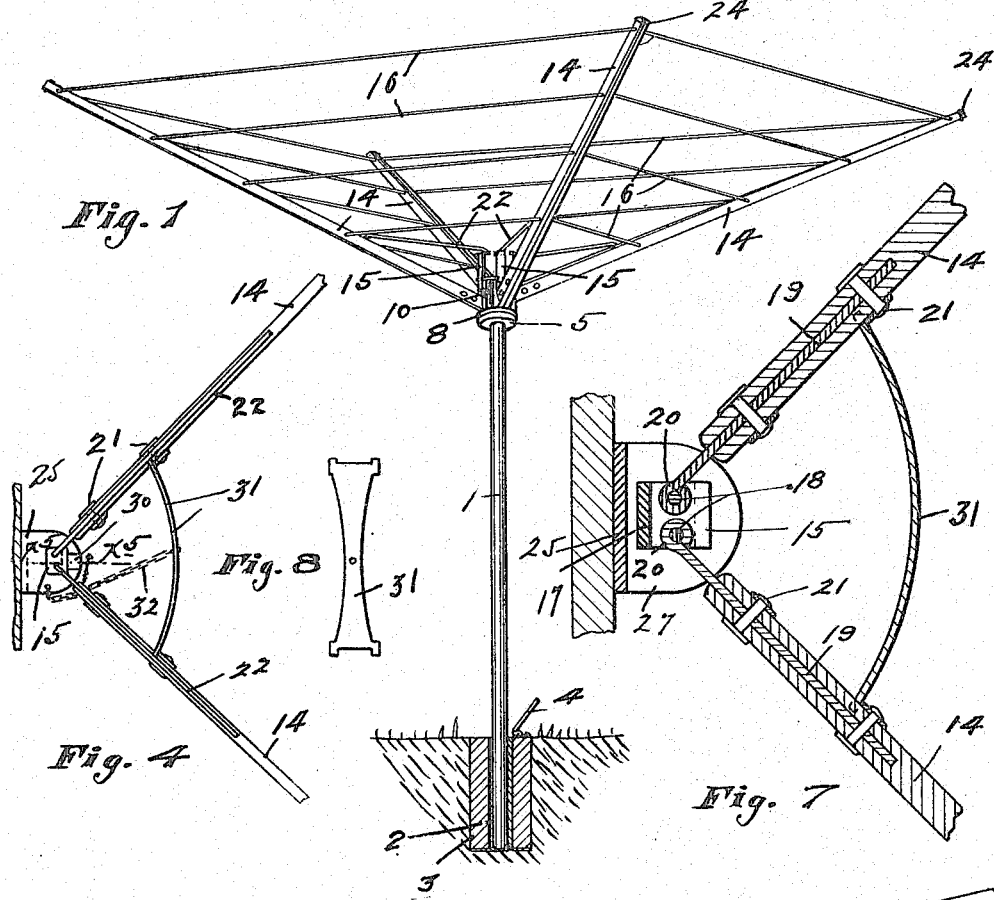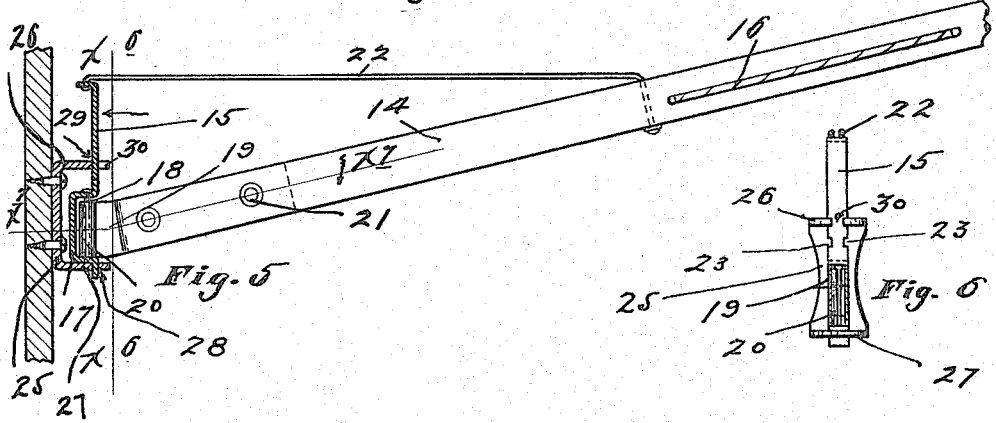

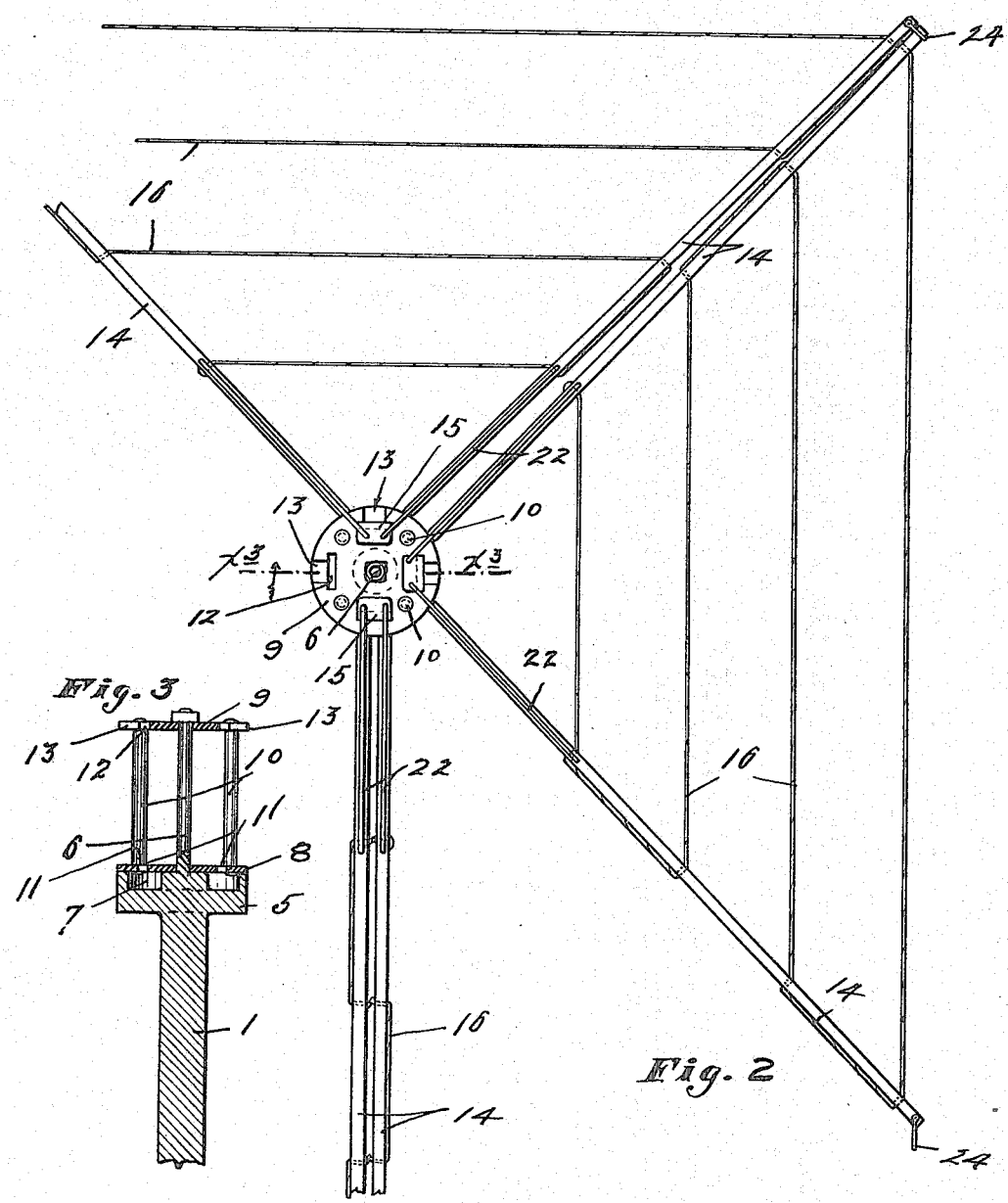

ROY N. HOLMES, OF MINNEAPOLIS, MINNESOTA, ASSIGNOR TO ADVANCE MANUFACTURING COMPANY, OF MINNEAPOLIS, MINNESOTA.

CLOTHES-DRIER.

1,122,276.  Specification of Letters Patent.  Patented Dec. 29, 1914.

Application filed April 27, 1914. Serial No. 834,568.

*To all whom it may concern:*

Be it known that I, ROY N. HOLMES, citizen of the United States, residing at Minneapolis, in the county of Hennepin and State of Minnesota, have invented certain new and useful Improvements in Clothes-Driers; and I do hereby declare the following to be a full, clear, and exact description of the invention, such as will enable others skilled in the art to which it appertains to make and use the same.

My invention has for its object to provide an improved clothes-drier; and, to this end, it consists of the novel devices and combinations of devices hereinafter defined and described in the claims.

In the accompanying drawings, which illustrate the invention, like characters indicate like parts throughout the several views.

Referring to the drawings:—Figure 1 is a perspective view of the improved clothes-drier; Fig. 2 is a plan view of the same, some parts being removed, and some parts being shown in a folded position; Fig. 3 is a detail view, principally in vertical section taken on the line $x^3$ $x^3$ of Fig. 2; Fig. 4 is a plan view of one of the reel sections removed from the reel head, and supported on a wall bracket; Fig. 5 is a view, partly in side elevation and partly in vertical section taken on the line $x^5$ $x^5$ of Fig. 4, on an enlarged scale; Fig. 6 is a detail view, partly in elevation and partly in transverse section taken on the line $x^6$ $x^6$ of Fig. 5; Fig. 7 is a detail view taken on the approximately horizontal line $x^7$ $x^7$ of Fig. 5; and Fig. 8 is an elevation of the so-called "spreader," used in connection with the wall bracket.

The numeral 1 indicates an upright post removably supported, at its lower end, in a socket 2 within a concrete base 3, located beyond the ground line. The socket 2 is provided with a hinged cover 4, provided for closing the same when the post 1 is removed therefrom, to prevent said socket from filling up with dirt, snow or ice. On the upper end of the post 1 is rigidly secured an annular supporting base 5, having an upwardly projecting spindle 6 and an annular channel 7 surrounding said spindle at its lower end.

Rotatively mounted on the spindle 6 is a reel head, which is supported from the base 5, and comprises a pair of annular plates or disks 8 and 9, connected and vertically spaced, the latter above the former, by a plurality, as shown—four, upright circumferentially spaced rods 10. Formed in the plates 8—9, between each pair of rods 10, is a pair of vertically spaced seats 11 and 12, respectively. As shown, these seats are formed by cutting or punching rectangular openings in said plates, and the seats 12 are provided with entrance passages 13, which extend from the periphery of the plate 9 into said seats.

The body of the reel comprises a plurality of pairs of arms 14, arm-supporting brackets 15, and clothes-lines 16. Each of the brackets 15 is formed, at its intermediate portion, near the lower end thereof, with a laterally offset portion 17, through which extends a pair of laterally spaced upright hinge pins 18 rigidly secured thereto at their ends. The inner ends of the arms 14 are secured to the hinge pins 18, for horizontal opening and closing movements, by hinge straps 19 having hinge lugs 20, through which said hinge pins pass. As shown, the inner ends of the arms 14 are bifurcated, to receive the hinge straps 19 which are secured thereto by rivets 21. Each pair of arms 14 is further supported, from its respective bracket 15, by brace rods 22 rigidly secured, at one of their ends, to the intermediate portions of the arms 14, and pivotally secured, at their other ends, to the upper end of said bracket. Obviously, these brace rods 22 prevent the arms 14 from sagging, and permit free horizontal swinging movement thereof. One of the clothes-lines 16 is secured to each pair of arms 14, and is extended back and forth, to give the maximum capacity to each pair of said arms.

Each pair of arms 14 is independently, detachably and interchangeably supported from the reel head by its respective bracket 15 mounted in any one pair of the seats 11—12. To permit the brackets 15 to be applied or removed from the reel head, the same are notched, at 23, in their vertical edges, in order to allow said brackets to be moved laterally through the entrance passages 13 into or out of the seats 12. A downward movement of the brackets 15 in the seats 12 will carry their lower ends into the seats 11 and their notches 23 out of alinement with the entrance passages 13, thus locking said brackets to the reel head. When mounted on the reel head, the lower ends of the brackets 15 work in the annular channel 7 formed in the base 5.

When all of the sections of the body of the reel are mounted on the reel head, the arms are locked open by U-shaped loops 24, pivotally secured, one to one of the outer ends of each pair of arms 14, and arranged to be turned over the outer end of the adjacent arm of the adjoining reel section, as best shown in Fig. 2.

The purpose of making the body of the reel in folding sections is to permit said sections to be independently removed from the reel head, carried into the house or laundry, and supported in a convenient place, while the clothes are pinned thereon, after which the reel section is carried back and placed in position on the reel head, with the clothes attached. For detachably supporting the reel sections in the house or laundry, I provide a wall bracket 25, adapted to be secured to a door-casing, or any other suitable place, by screws. This bracket 25 is formed with upper and lower flanges 26 and 27, respectively, spaced one above the other a distance corresponding to the distance between the plates 8—9 of the reel head. In the lower flange 27 is formed a seat 28, and in the upper flange 26 is formed a seat 29 and an entrance passage 30 leading thereto. These seats 28—29 and entrance passage 30 are identical in form with the seats and entrance passage formed in the reel head; and the brackets 15 are applied to and removed therefrom in the same manner in which they are applied to or removed from the reel head. While the clothes are being pinned to the line on a reel section supported from the wall bracket, the arms of the reel section are held open by a segmental spreader 31, having forked ends which embrace the arms at their inner faces. A short chain 32 connects the spreader 31 to the wall bracket, to hold the same in a convenient position, when not in use, and to prevent the same from becoming lost.

The above described device, while extremely simple and of comparatively small cost to manufacture, will be found highly efficient for use in cold and inclement weather, whereby the clothes may be pinned onto the reel sections in the house, and then carried out and placed in position on the reel head, to dry. After the clothes are dry, the reel sections may again be carried into the house, one at a time, mounted on the wall bracket, and the clothes removed.

As is well known, considerable damage is usually done to the clothes in the winter-time in removing the same from the line when frozen. By the use of my improved drier, the clothes may remain on the reel sections in the house a sufficient length of time to permit the same to thaw, before being removed from the clothes-line.

What I claim is:

1. In a clothes-drier, the combination with a post, of a reel head mounted on said post, a plurality of brackets independently and removably mounted on said reel head, a pair of arms hinged to each of said brackets, a line secured to each of said pairs of arms, and means for holding said arms open when supported from said reel head.

2. In a clothes-drier, the combination with a post, of a reel head having a plurality of circumferentially spaced duplicate seats, a plurality of duplicate brackets interchangeably and removably mounted in the seats of said reel head, a pair of arms hinged to each of said brackets, a line secured to each of said pairs of arms, and means for locking adjacent arms of the different pairs together when supported from said reel head.

3. In a clothes-drier, the combination with a post, of a reel head having a plurality of circumferentially spaced duplicate seats, a plurality of duplicate brackets interchangeably and removably mounted in the seats of said reel head, a pair of arms hinged to each of said brackets, a line secured to each of said pairs of arms, brace rods connecting each pair of said arms to its respective bracket, with freedom for opening and closing movements, and means for locking the outer ends of adjacent arms of the different pairs together when supported from said reel head.

4. In a clothes drier, the combination with a support, of a bracket removably mounted on said support, a pair of folding arms mounted on said bracket, a line secured to said arms, and means for holding said arms open when said bracket is mounted on said support.

5. In a clothes drier, the combination with a support, having a plurality of duplicate seats, of a plurality of duplicate brackets, interchangeably and removably mounted in said seats, a pair of arms secured to each of said brackets, at least one arm of each pair being hinged to its respective bracket, a line secured to each pair of said arms, and means for holding said arms open when mounted on said support.

In testimony whereof I affix my signature in presence of two witnesses.

ROY N. HOLMES.

Witnesses:
ALICE L. KING,
HARRY D. KILGORE.